R. B. WILLIAMSON.
ADJUSTABLE BEARING FOR DYNAMO ELECTRIC MACHINES.
APPLICATION FILED APR. 19, 1909.
1,144,627. Patented June 29, 1915.
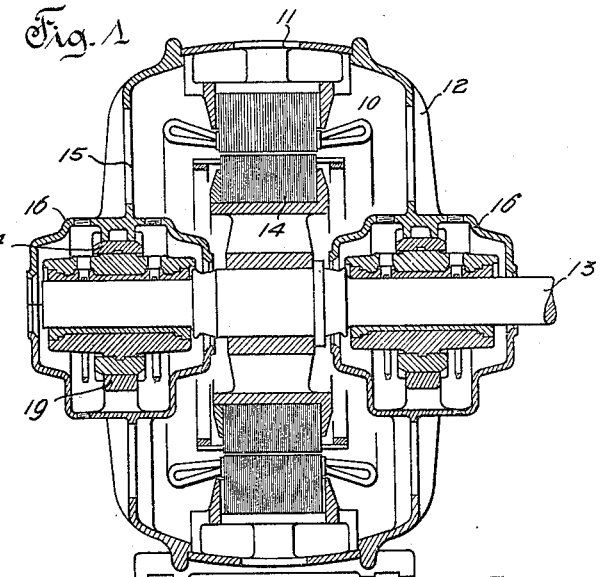
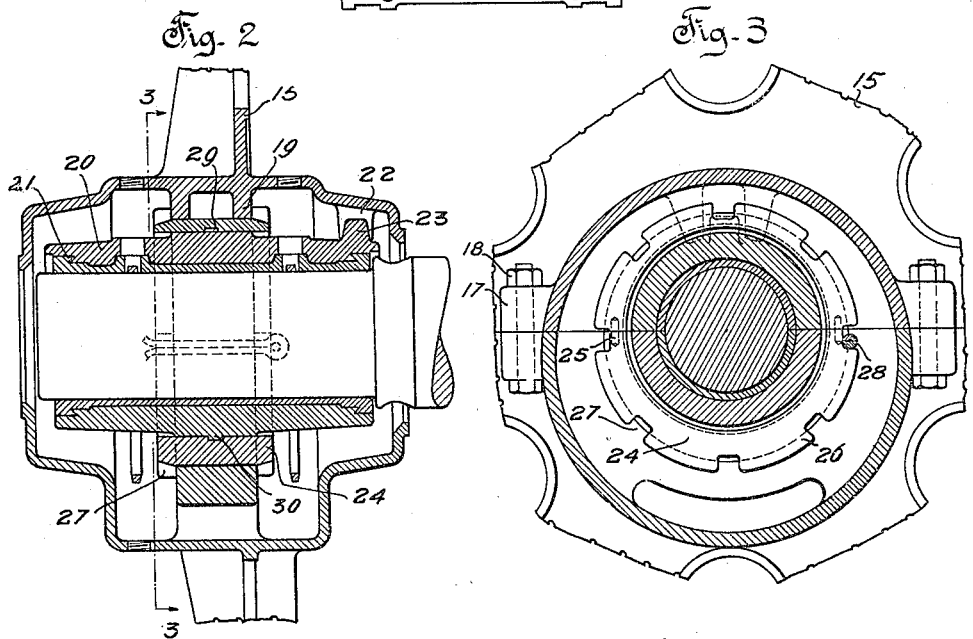
Witnesses
Rob. E. Stoll.
Chas. L. Byron.
Inventor
Robert B. Williamson
By Chas. E. Lord
Attorney

UNITED STATES PATENT OFFICE.

ROBERT B. WILLIAMSON, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

ADJUSTABLE BEARING FOR DYNAMO-ELECTRIC MACHINES.

1,144,627. Specification of Letters Patent. Patented June 29, 1915.

Application filed April 19, 1909. Serial No. 490,969.

*To all whom it may concern:*

Be it known that I, ROBERT B. WILLIAMSON, a citizen of the United States, residing at Milwaukee, in the county of Milwaukee and State of Wisconsin, have invented certain new and useful Improvements in Adjustable Bearings for Dynamo-Electric Machines, of which the following is a full, clear, and exact specification.

This invention relates to shaft bearings and particularly to the bearings for shafts of dynamo-electric machines, such as induction motors.

In certain types of dynamo-electric machines, notably induction motors, the air gap or clearance between the stator and rotor is made very small in order that the efficiency may be high. Inasmuch as the attraction between the stator and rotor at any particular part of the machine varies inversely as the width of the air gap or clearance, it will be apparent that for the best running conditions of a machine particularly of an induction motor wherein the clearance is very small, the motor must be centered with respect to the stator. However, even if the rotor is carefully centered when the machine is originally assembled, the weight of the rotor in time causes the lower parts of the shaft bearings to be worn away, with the result that the shaft and rotor are gradually lowered with respect to the stator. As soon as the clearance between the stator and rotor becomes appreciably less at the bottom of the machine than at the upper part due to the wear of the bearings, the pressure of the shaft on the bearings is considerably increased since the downward pressure is then due not only to the weight of the rotating parts but also to the increased downward drag or magnetic pull between the stator and rotor. Inasmuch as this downward pull increases rapidly with the decrease in the clearance at the lower part of the machine, it is apparent that unless some provision is made for adjusting the shaft and rotor vertically, the bearings will be worn away rapidly and new bearings must be supplied from time to time.

The object of the present invention is to provide improved means for adjusting the bearings of the shaft so as to raise the rotor to compensate for the vertical displacement of the latter with respect to the stator due to the wearing away of the bearings.

My invention contemplates the use of eccentric sleeves or bushings between the bearing housings and the bearings or bearing sleeves of the shaft, these bushings having sufficient eccentricity that when turned from time to time in the housings they will give the shaft sufficient upward movement to cause the downward magnetic pull on the rotor to be substantially the same as or even less than the upward magnetic pull.

The invention may be further briefly summarized as consisting in certain novel details of construction and combinations and arrangements of parts which will be described in the specification and set forth in the appended claims.

For a better understanding of my invention, reference is had to the accompanying sheet of drawings, in which—

Figure 1 is a longitudinal vertical sectional view of an induction motor equipped with my invention; Fig. 2 is a longitudinal vertical sectional view taken through one of the bearings, the parts being shown on an enlarged scale; and Fig. 3 is a transverse sectional view taken substantially along the line 3—3 of Fig. 2 looking in the direction indicated by the arrow.

In the present case I have shown my invention as applied to an induction motor of the self contained type, or of the type wherein the bearings for the shaft are supported in housings which are carried by, or are integral with the end housings of the motor frame, but it is apparent that it is immaterial whether the bearings are supported in separate bearing members, or are supported by the frame of the machine.

In the embodiment of my invention here shown, 10 represents the stator of an induction motor having a yoke 11 and end housings 12 which are secured to the yoke, and 13 represents the motor shaft on which is mounted the rotor 14, which, as shown in the drawings has its outer periphery separated from the inner periphery of the core by a very small annular clearance space, although the clearance is here shown much larger than it would actually be if the parts were shown in their true or exact proportions. Each end housing 12 is in this case divided into two parts, the line of division being preferably in line with the center of the shaft, and in this case each housing includes radial arms 15 and a central bearing housing 16, each bearing housing being in two parts which are secured together in this instance by means of integral oppositely disposed lugs 17 and bolts 18. As is shown clearly in the drawings, each bearing housing is provided with an inwardly extending flange 19, the inner surface of which is cylindrical and is eccentric with respect to the center of the shaft.

The shaft is supported in bearing sleeves 20 provided with the usual anti-friction bearing linings 21, which may be formed from cast Babbitt metal or other suitable bearing metal, these sleeves 20 being held in position with respect to the housings or prevented from rotating by means of inwardly extending lugs 22 near the ends of the housings, and by lugs 23 on the sleeves and extending between the lugs 22. These bearing sleeves are not supported directly by the bearing housings as is usually the case, but in this instance they are supported by eccentric sleeves or bushings 24, the outer surfaces of which are eccentric with respect to the shaft and bear upon the inner surfaces of the internal flanges 19 of the housings, and the inner surfaces of which, in this case engage the annular outer surfaces of the bearing sleeves 20. As is clearly shown in the drawings, each of these eccentric bushings 24 is in two parts or halves which are divided along the center of the shaft and are held or locked together, in this instance, by dowel pins 25. Each bushing 24 is also provided on opposite sides of the internal flange 19 of the corresponding bearing housing with external flanges 26 which are provided at regular intervals with notches 27, the notches in the two flanges being in alinement. Relative rotation between the eccentric bushings 24 and the bearing housings is normally prevented by transverse members 28, in this case cotter pins, which extend through internal flanges 19 near the inner peripheries thereof and also through or into the notches 27 of the external flanges 26 of the eccentric bushings. Endwise movements of the bearing sleeves 20 are prevented in this case by means of interfitting annular grooves 29 and projections 30 on the adjacent surfaces of the bushings 24 and sleeves 20 respectively.

When the machine is originally assembled the bushings will be so located and locked in position by the cotter pins 28 that the rotor will be properly located or centered with respect to the stator so as to result in the most desirable running conditions. When however, the bottoms of the bearings have become worn due to the weight of the rotating parts and when it is desired to raise the shaft and rotor, all that is necessary is to remove the cotter pins, turn the eccentric bushings through suitable arcs and then again lock the bushings in place by replacing the cotter pins. When these eccentric bushings are turned in this manner, the shaft is given a slight vertical movement and at the same time of course, a slight lateral movement, but this lateral displacement will have less effect upon the bearings than the downward displacement of the same amount, inasmuch as the wearing effects due to the weight of the rotating parts and to the increased downward drag or pull over the upward pull are additive.

It will be seen that the construction which I have provided is very simple but strong and effective and that the adjustment can be easily and quickly made and the life of the bearings thereby prolonged.

I do not desire to be confined to the exact details shown, but aim in my claims to cover all modifications which do not involve a departure from the spirit and scope of my invention.

What I claim as new is:

1. In combination, a rotary shaft, a bearing sleeve engaging said shaft, an adjustable eccentric bushing engaging said bearing sleeve and having a plurality of notched flanges extending outwardly therefrom, a housing having an inwardly extending flange engaging a peripheral surface of said bushing and an end surface of at least one of said notched flanges, and means co-acting with a notch of each of said bushing flanges and with said housing flange for locking said bushing to said housing.

2. In combination, a shaft, bearing sleeves therefor, eccentric bushings surrounding and engaging the sleeves, said bushings each having a pair of external notched flanges, housings inclosing the sleeves and bushings, said housings having inwardly extending flanges engaging said bushings intermediate the flanges thereof, and means engaging the notched portions of said flanges to prevent movement of said bushings.

3. In combination, a shaft, bearing sleeves therefor, eccentric bushings surrounding and engaging the sleeves, said bushings having external flanges notched at intervals, housings having internal flanges engaging the outer surfaces of the bushings, and transverse members extending through the internal flanges of the housings into notches of the bushings, and serving to hold the bushings and housings in relatively fixed positions.

4. In combination, a shaft, bearing sleeves therefor, eccentric bushings surrounding and engaging the sleeves, said bushings and sleeves having interfitting parts which prevent endwise movement of the sleeves, bearing housings surrounding the sleeves and bushings, said housings and bushings having interfitting parts which prevent endwise movement of the bushings, and members extending transversely through said last named interfitting parts and serving when in position to prevent circumferential movement of the bushings relative to the housings.

Milwaukee, Wis., April 14, 1909.
In testimony whereof I affix my signature, in the presence of two witnesses.

ROBERT B. WILLIAMSON.

Witnesses:
H. C. CASE,
CHAS. L. BYRON.

Copies of this patent may be obtained for five cents each, by addressing the "Commissioner of Patents, Washington, D. C."